United States Patent

[11] 3,576,203

[72] Inventor Rene Cote
 201, de l Eglise Street, Donnacona, Quebec, Canada
[21] Appl. No. 850,575
[22] Filed Aug. 15, 1969
[45] Patented Apr. 27, 1971
[32] Priority Dec. 6, 1968
[33] Canada
[31] 037,118

[54] CHIP CONVERTER
16 Claims, 6 Drawing Figs.
[52] U.S. Cl. .................................................. 144/3, 144/2, 144/309
[51] Int. Cl. ..................................................... A01g 23/02
[50] Field of Search ........................................... 144/2 (N), 2 (Z), 3 (D), 309 (AC)

[56] References Cited
UNITED STATES PATENTS
| | | | |
|---|---|---|---|
| 1,534,857 | 4/1925 | McKoy | 144/2 |
| 2,583,971 | 1/1952 | Shuff | 144/2 |
| 2,707,008 | 4/1955 | Bannister | 144/309 |
| 3,198,224 | 8/1965 | Hiley | 144/2 |

Primary Examiner—Gerald A. Dost
Attorney—Raymond A. Robic

ABSTRACT: An apparatus for chipping an upright standing tree, from the top to the bottom, formed of a hollow body having a bottom central aperture through which the top of a tree is to be inserted, a free-ended shaft mounted centrally of and within this body for rotation about a vertical axis in general alignment with the axis of the tree to be chipped, this body being formed with a stationary top part and a rotary bottom part secured to the shaft. A set of planetary rotary cutters are mounted at one end on the free end of the shaft and angularly thereof so as to be rotated by the shaft about the shaft axis. A journal is provided on the rotary bottom part and on the other end of the rotary cutters to allow rotation of the cutters about their own axis. The stationary top part is formed with a circular gear along the lower edge and the planetary cutters are provided with gears at one end to mesh with the circular gear.

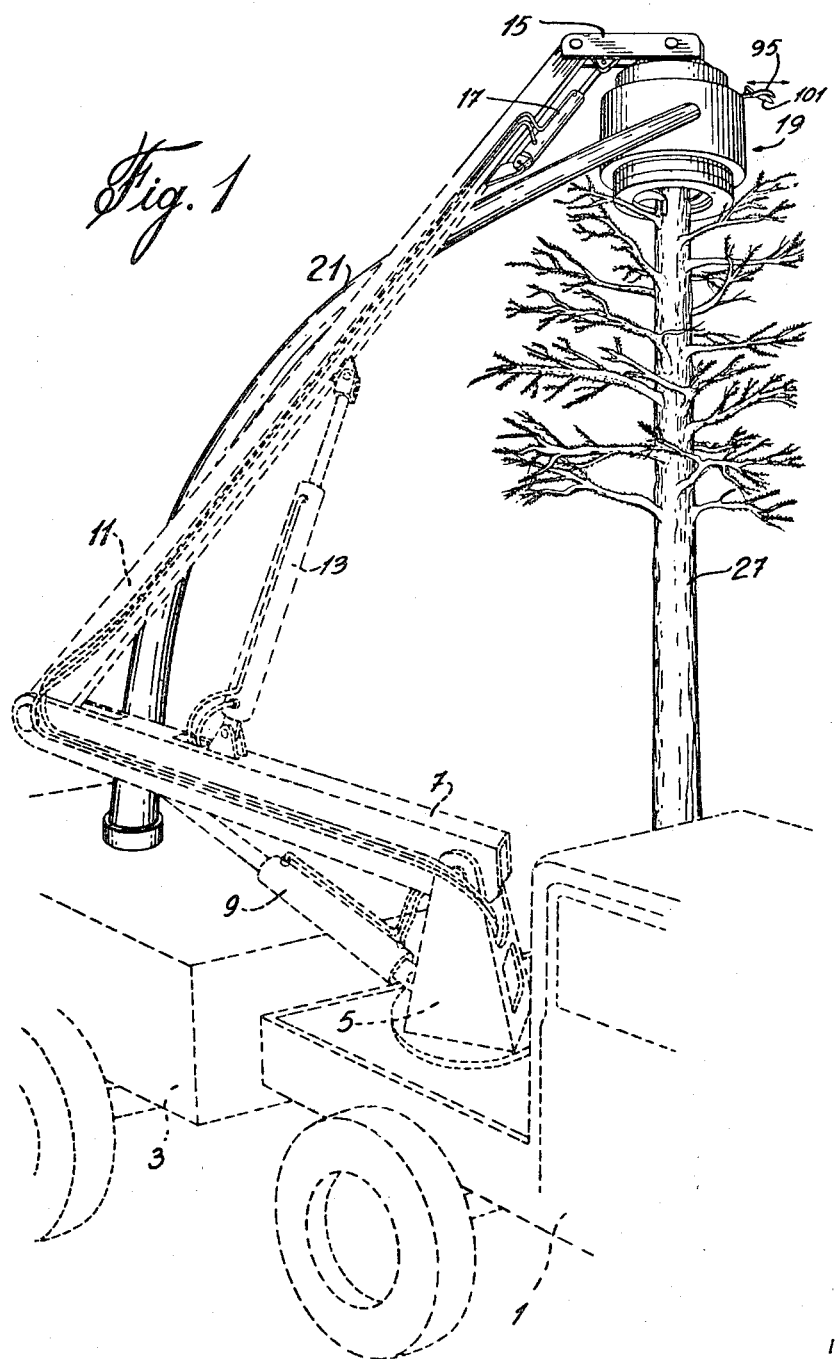

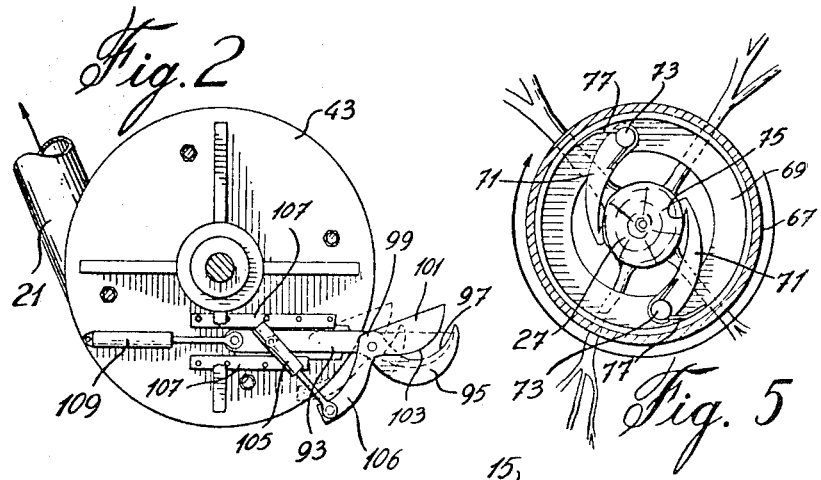
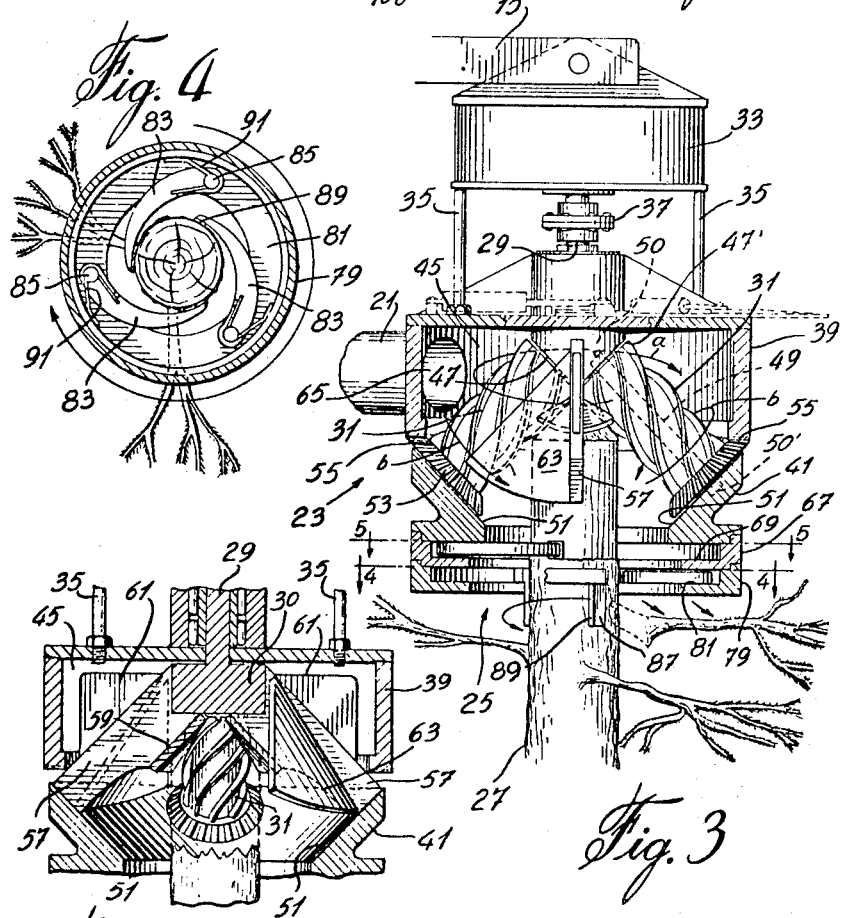

CHIP CONVERTER

The present invention generally relates to a chip converter and more specifically to a machine for reducing trees into small wood chips.

In the logging industry, it is customary to proceed by cutting trees down, limbing them of their branches, drawing the trunks to a pick up site, loading them on trucks, carrying them to a mill where they are cut into logs and then mechanically reduced to chips. In some cases, the sequence of steps is somewhat different but all the aforementioned steps are usually present. Such a procedure of course involves a considerable outlay of capital and labor.

It is therefore a main object of the invention to substantially simplify the above-mentioned procedure by considerably reducing the operating steps between the cutting of the trees and the reduction thereof into chips, at the mill.

Another object of the invention is to reduce the trees into wood chips right on location, that is in the wood or forest, so that the chips may immediately be carried to the mill without any of the intermediary steps mentioned above in respect to the conventional procedure.

A further object of the invention and a very important one, is to prevent damaging the wood or forest by leaving the soil intact and by giving it back all of the fertilizing elements contained in the needles (in the case of evergreen cutting), in the branches and in the bark. This is obtained by chopping the trees when the latter are in an upright standing position.

More specifically, the chip converter or apparatus according to the invention comprises a hollow body formed with a bottom central aperture through which the top of a tree is to be inserted, axially of the body. A free ended shaft is mounted centrally of and within the body for rotation about a vertical axis in general alignment with the axis of the tree to be chopped. This shaft is provided, at one end and within the body, with planetary rotary cutters extending angularly of the shaft so that these planetary cutters are rotated when the shaft is brought into rotation. Finally, means are provided for causing rotation of the rotary cutters about their own axis as the rotary cutters are brought into rotation about the shaft axis whereby when the apparatus sits on the top of a tree and the shaft is brought into rotation, the rotary angular cutters are also brought into rotation about their own axis whereby they chop off the tree into small wood chips, in a manner similar to that of a pencil eraser.

In the preferred embodiment of the invention, the body is formed with a stationary top part and a rotary bottom part fixed to the shaft and a journal means is provided on the rotary bottom part and on the outer end of the rotary cutters to allow rotation thereof about their own axis. The means for causing rotation of the planetary cutters is a circular gear formed along the lower edge of the stationary top part and bevel gears secured at the outer ends of the planetary cutters and in mesh with the circular gear. In this manner, rotation of the planetary gears about the shaft axis causes rotation of the planetary gears about their own axis by virtue of the meshing with the circular gear.

Several other constructional features and advantages of the invention will become apparent from the following description of a preferred embodiment having reference to the appended drawing wherein:

FIG. 1 is a general perspective view of a machine provided with the device of the invention;

FIG. 2 is a tip plan view of the chip converter of the invention;

FIG. 3 is a vertical cross-sectional view of the chip converter as shown sitting on a tree being chopped off;

FIG. 4 is a cross-sectional view taken along line 4—4 of FIG. 3;

FIG. 5 is a transverse cross-sectional view taken along line 5—5 of FIG. 3; and

FIG. 6 is a vertical cross-sectional view of the device taken at right angles to the cross-sectional view of FIG. 3, along line 6—6 thereof.

With the reference to the drawings, particularly FIG. 1, there is shown, in dotted lines, a vehicle 1 to which is hitched a chip collector 3. A boom carrier 5 is mounted at the back of the vehicle 1 for pivotal movement about a vertical axis. One end of a lower boom 7 is mounted at the top of the carrier 5 for pivotal movement about a horizontal axis, this movement being obtained by means of a first hydraulic motor 9. An upper boom 11 is connected at the lower end for pivotal movement also about a horizontal axis, this movement being obtained by means of a second hydraulic motor 13. It will of course be understood that the aforedescribed construction is quite conventional and no further details need be given thereof.

A short boom 15 is provided at the top of the upper boom 11 and is pivotally connected thereto for rotation about a horizontal axis, which movement is obtained by means of a third hydraulic motor 17. All three motors 9, 13 and 17 are fed with operating pressure fluid by means of conventional lines, shown in dotted lines in FIG. 1, and are operated also by means of conventional control means which do not form part of the present invention.

It will be understood, from the following description, that the short boom 15 is normally held in horizontal position during operation of the chip converter 19 which hangs from the free outer end of the short boom 15, being connected thereto for pivotal movement about a horizontal axis as best illustrated in FIG. 3.

In a manner to be further explained hereinafter, a flexible duct 21 connects the chip converter 19 to the chip collector 3 for transferring the wood chips from the converter 19 to the collector 3. It will of course be gathered that collector 3 is merely a hollow box or container for receiving the wood chips.

Reference is now made to FIGS. 2 through 6 for a detailed description of the chip converter itself.

Broadly, the chip converter or apparatus according to the invention comprises a hollow body 23 formed with a bottom central aperture 25 through which the top of a tree 27 intended to be chopped into small chips is to be inserted, axially of the body 23. A free-ended shaft 29 is mounted centrally of and within body 23 for rotation about a vertical axis in general alignment with the axis of the tree 27. Shaft 29 is formed, at one end and within the body 23, with an enlargement 30 (FIG. 6) provided with planetary rotary cutters 31 extending angularly of the shaft 29 so as to be brought into rotation about a vertical axis when the shaft 29 itself is brought into rotation. Finally, a gear assembly to be further described hereinafter is provided for causing rotation of the rotary cutters 31 about their own axis as they are brought into rotation about the shaft axis so that when the apparatus sits on the tree 27 and shaft 29 is rotated, cutters 31 are also brought into rotation about their own axis and thus chop off the tree into small wood chips, much in the same manner as that of a pencil eraser.

Now for a more detailed description of the chip converter or apparatus 19.

As said previously, the latter oscillatably hangs from a horizontal short boom 15 and has, at the top thereof, a casing 33 intended to contain the operating motor and speed reducer, if necessary. The hollow body 23, aforesaid, is connected to casing 33 by means of a plurality of short columns 35 distributed circumferentially of casing 33.

Shaft 29 may be connected to the motor assembly in the casing 33 through any conventional coupling 37.

The hollow body 23 is formed of a top part 39 held stationary through its connection to the casing 33 by means of column 35. Body 23 also comprises a rotary bottom part 41 to be further described hereinafter.

Shaft 29 extends through the upper closing wall 43 (see FIG. 2) of the top part 39 and its enlargement 30 defines, at the free end thereof inside chamber 45 of top part 39, bevel faces 47, 47′. To these faces are mounted the rotary cutters 31 for rotation about their own longitudinal axis as by means of axles 49 rotatable into suitable bearing recesses 50 in the faces 47, 47′ of the shaft 29. The other ends of the rotary cutters 31 are likewise mounted for rotation by means of the other ends of the axles 49 journaling into suitable housings 50' in the bottom part 41. Bevel faces 47, 47' preferably make an angle of 45° with the axis of shaft 29 and, likewise, bottom part 41 defines a bevel face 51 also making an angle of 45° with the axis of shaft 29. It is through this face 51 that the journal housing 50' for axles 49 are provided.

In order to obtain rotation of cutters 31 about their own axis, they are provided at their ends away from shaft 29 with bevel gears 53 intended to mesh with a circular gear 55 formed along the lower peripheral edge of the cylindrical stationary top part 39.

As best illustrated in FIG. 6, the bottom part 41 is secured to the rotary shaft 59 by means of arms 57 angularly downwardly extending from the said shaft 29 to be secured, as by welding, to the bevel face 51 of bottom part 41. Obviously, arms 57 extend between the cutters 31, as best illustrated in FIG. 3.

In order that the whole apparatus 19 sit properly on top of tree 27, bearing means are provided in the form of plates 59 (FIG. 6) having the shape of spherical sectors. These plates are provided between the successive rotary cutters 31 and are secured, as by welding, to the arms 57.

Additionally, upstanding blades 61 (FIG. 6) are secured to arms 57 and project upwardly from the back thereof for a purpose to be determined hereinafter.

Finally, arcuate baffles 63 are connected to the side faces of arms 57 to project forwardly with respect to the direction of rotation of shaft 29 and adjacent cutters 31.

It will be noted that upstanding blades 61 are contained wholly within chamber 45 of top part 39 and, as has been found, act with baffles 63 to force wood chips into the discharge pipe 21, previously mentioned, that extends tangentially of chamber 41 and of which the end aperture 65 is shown in FIG. 3.

It will thus be appreciated from the above description that rotation of shaft 29 in the direction of arrow a of FIG. 3 will cause like bodily rotation of cutters 31 and in view of the meshing action between bevel gears 53 of the said cutters with the circular gear 55 of the top part 39, rotation of cutters 31 about their own axis, as indicated by arrows b of FIG. 3.

To the bottom periphery of the bottom part 41 is secured, as by screwing or otherwise, a first ring 67 formed with an inwardly directed radial flange 69. As best shown in FIG. 5, knife means are provided on this flange 69 for removing the bark from the tree being chopped. This knife means comprises a plurality of arcuate levers 71 pivotally mounted at one end 73 to radial flange 69 and formed, at the free end thereof, with a sharp edge 75 reentrant with regard to the direction of rotation of the bottom part and ring 67 whereby to cut the bark off the tree. Resilient means in the form of a spring 77 force the levers 71 against the tree.

Below the first ring 67 and fastened thereto as by screwing is a second ring 79 having an inwardly directed radial flange 81 similar to flange 69. On this flange, as shown in FIG. 4, are mounted a plurality of horizontal arcuate levers 83 pivotally mounted at one end 85 to the flange 81. Levers 83 are provided at the free ends thereof with downwardly projecting knives 87 (illustrated in FIG. 3) formed with cutting edges 89 reentrant with respect to the direction of rotation of bottom part 41. Springs 91, similar to springs 77 of FIG. 5, force the knives against the tree being chopped. As will be gathered from FIG. 3, knives 87 serve to cut the branches off the tree.

With reference to FIG. 2, the upper closing wall 43 of the top part 39 is provided with horizontal removable shears for cutting the tree tops whenever necessary to properly introduce the chip converter or apparatus 19 over the top of the tree to be chopped.

The above-mentioned shears comprise an elongated arm 93 cooperate, in shear fashion, with the sickle cutting edge 97. A hydraulic motor 105 is operatively connected at one end to the branch 106 of the lever 99 and at the other end to the horizontal arm 93. Motor 105 thus constitutes an operating means for the aforedescribed shears.

It is also necessary, or at least preferable, that the aforedescribed shears be removable from a retracted position wholly within the circumference of the upper closing wall 43 to an extracted position, as shown in FIG. 2, which is also the position of operation. The extracting and retracting means may comprise a pair of parallel guides 107 for guiding the shear arm 93 and a hydraulic motor 109 for providing the necessary reciprocating action for the arm 93.

The guides 107 as well as arm 93 may have cooperating dovetail configuration or other configurations that would allow proper guiding of the said arm 93.

As will be noted from FIGS. 3 and 6, rotary cutters 31 are of the helicoidal ridge-cutting type.

I claim:

1. Apparatus for chipping an upright standing tree from the top to the bottom thereof, comprising:
    a. a hollow body having a bottom central aperture through which the top of a tree is to be inserted, axially of said body;
    b. a free-ended shaft mounted centrally of and within said body for rotation about a vertical axis in general alignment, during operation of said apparatus, with the axis of the tree to be chipped;
    c. planetary rotary cutters mounted at one end thereof on said free end of said shaft, angularly thereof, whereby to be rotated by said shaft about said shaft axis, and
    d. means for causing rotation of said rotary cutters about their own axis as said rotary cutters rotate about said shaft,
    whereby when said apparatus bears on the top of a tree to be chipped and said shaft rotates, it brings said angular rotary cutters into rotation to chip off said tree.

2. An apparatus as claimed in claim 1, wherein said body is formed with a stationary top part and a rotary bottom part fixed to said shaft; wherein journal means is provided on said rotary bottom part and on the other end of said rotary cutters to allow rotation thereof about their own axes; wherein said means for causing rotation of said planetary cutters are a circular gear formed along the lower edge of said stationary top part and bevel gears secured at said other ends of said planetary cutters and in mesh with said circular gear, whereby rotation of said planetary gears about the shaft axis causes rotation of the planetary gears about their own axis by virtue of their meshing with said circular gear.

3. An apparatus as claimed in claim 2 wherein said planetary cutters are of the helicoidal cutting-ridge type.

4. An apparatus as claimed in claim 2 wherein said bottom part is fixed to said shaft by means of arms extending radially of said shaft and between said cutters.

5. An apparatus as claimed in claim 4 including bearing means connected to said arms and intended to support said apparatus on the top of the tree to be chipped.

6. An apparatus as claimed in claim 5 wherein said bearing means are plates having the shape of spherical sectors; said plates provided between successive rotary cutters and secured to said arms; wherein said plates, in operation of said apparatus, sit over the tip of the tree to be chipped in the manner of a cap.

7. An apparatus as claimed in claim 4 wherein said stationary top part defines a circular inner chamber and including a chip discharge pipe opening into said chamber, tangentially thereof.

8. An apparatus as claimed in claim 7, wherein said arms are downwardly inclined and provided, along their inclined outer edges with flat blades and are also provided with arcuate baf- 9. An apparatus as claimed in claim 4, including knife means at the lower end of said bottom part for barking the tree to be chipped.

10. An apparatus as claimed in claim 9, wherein said knife means comprise a plurality of arcuate levers pivotally mounted at one end to said bottom part below said rotary cutters and formed, at the free end thereof, with a sharp edge reentrant with respect to the direction of rotation of said bottom part whereby to cut the bark off the tree, and resilient means pressing said levers against the tree.

11. An apparatus as claimed in claim 4, including cutting means at the lower end of said bottom part for limbing trees to be chipped.

12. An apparatus as claimed in claim 11 wherein said cutting means comprise a plurality of horizontal arcuate levers pivotally mounted at one end to said bottom part, below said rotary cutters and formed, at the other end, with downwardly projecting knives having cutting edges reentrant with respect to the direction of rotation of said bottom part and resilient means to press said knives against trees to be chipped.

13. An apparatus as claimed in claim 4 wherein said top part is formed with an upper closing wall and horizontally movable shears provided on said wall for cutting tree tops and means horizontally to extract and retract said shears with respect to said body and further means to operate said shears.

14. An apparatus is claimed in claim 13, wherein said shears comprise an elongated arm having a sickle-shaped end with an inner sharp cutting edge and a lever centrally pivotally mounted adjacent said sickle-shaped end to said elongated arm; said lever having one branch provided with an arcuate cutting edge adapted to coact in shear fashion with said sickle cutting edge; wherein said extracting and retracting means comprise guides for controlling the movements of said arm and a hydraulic motor operatively connected to said arm, and wherein said operating means is a hydraulic motor connected at one end to said arm and at the other end to the end of a second branch of said lever.

15. A machine for chipping an upright standing tree, comprising:
   a. a vehicle;
   b. a carrier mounted on said vehicle to pivot about a vertical axis;
   c. a lower boom and an upper boom;
   d. means pivotally interconnecting said booms and means to produce relative swinging movement of said booms about a horizontal axis;
   e. means pivotally mounting said lower boom on said carrier and means to produce swinging movement of said lower boom relative to said carrier about a vertical axis;
   f. a hollow body pivotally mounted at the upper end of said upper boom;
   g. said hollow body having a bottom central aperture through which the top of a tree is to be inserted, axially of said body;
   h. a free-ended shaft mounted centrally of and within said body for rotation about a vertical axis in general alignment, in operative position, with the axis of the tree to be chipped;
   i. planetary rotary cutters mounted at one end thereof on said free end of said shaft angularly thereof, whereby to be rotated by said shaft about said shaft axis; and
   j. means for causing rotation of said rotary cutters about their own axis as said rotary cutters rotate about said shaft,
   whereby when said apparatus bears on said tree top and said shaft rotates, it brings said angular rotary cutters into rotation to chip off said tree during rotation thereof.

16. An apparatus is claimed in claim 15 wherein said body is formed with a stationary top part and a rotary bottom part fixed to said shaft; wherein journal means is provided on said rotary bottom part and on the other end of said rotary cutters to allow rotation thereof about their own axes; wherein said means for causing rotation of said planetary cutters are a circular gear formed along the lower edge of said stationary top part and bevel gears secured at said other ends of said planetary cutters and in mesh with said circular gear, whereby rotation of said planetary gears about the shaft axis causes rotation of the planetary gears about their own axis by virtue of their meshing with said circular gear.